US008301638B2

(12) United States Patent
Xu et al.

(10) Patent No.: US 8,301,638 B2
(45) Date of Patent: Oct. 30, 2012

(54) AUTOMATED FEATURE SELECTION BASED ON RANKBOOST FOR RANKING

(75) Inventors: Ning-Yi Xu, Beijing (CN); Feng-Hsiung Hsu, Cupertino, CA (US); Rui Gao, Beijing (CN); Xiong-Fei Cai, Beijing (CN); Junyan Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 12/238,012

(22) Filed: Sep. 25, 2008

(65) Prior Publication Data

US 2010/0076911 A1    Mar. 25, 2010

(51) Int. Cl.
- G06F 7/00 (2006.01)
- G06F 17/30 (2006.01)
- G06F 15/18 (2006.01)

(52) U.S. Cl. .......................................... 707/748; 706/20
(58) Field of Classification Search .................... 707/48; 706/12, 14–15, 20
See application file for complete search history.

(56) References Cited

U.S. PATENT DOCUMENTS

| | | | |
|---|---|---|---|
| 5,320,538 A | 6/1994 | Baum | |
| 5,423,554 A | 6/1995 | Davis | |
| 5,432,895 A | 7/1995 | Myers | |
| 5,490,784 A | 2/1996 | Carmein | |
| 5,577,981 A | 11/1996 | Jarvik | |
| 5,712,922 A | 1/1998 | Loewenthal et al. | |
| 5,883,628 A | 3/1999 | Mullaly et al. | |
| 5,892,961 A | 4/1999 | Trimberger | |
| 5,892,962 A | 4/1999 | Cloutier | |
| 5,913,727 A | 6/1999 | Ahdoot | |
| 6,011,407 A | 1/2000 | New | |
| 6,037,914 A | 3/2000 | Robinson | |
| 6,064,749 A | 5/2000 | Hirota et al. | |
| 6,084,979 A | 7/2000 | Kanade et al. | |
| 6,102,832 A | 8/2000 | Tani | |
| 6,122,627 A | 9/2000 | Carey et al. | |
| 6,134,540 A | 10/2000 | Carey et al. | |
| 6,141,034 A | 10/2000 | McCutchen | |
| 6,199,008 B1 | 3/2001 | Aratow et al. | |
| 6,222,757 B1 | 4/2001 | Rau et al. | |

(Continued)

FOREIGN PATENT DOCUMENTS

EP    1170868 A1    1/2002

OTHER PUBLICATIONS

Xiaoming Liu and Ting Yu, Gradient Feature Selection for Online Boosting, 11th International Conference on Computer Vision, published Oct. 2007, pp. 1-8.*

(Continued)

*Primary Examiner* — James Trujillo
*Assistant Examiner* — Jeff A. Burke
(74) *Attorney, Agent, or Firm* — Lee & Hayes, PLLC

(57) ABSTRACT

A method using a RankBoost-based algorithm to automatically select features for further ranking model training is provided. The method reiteratively applies a set of ranking candidates to a training data set comprising a plurality of ranking objects having a known pairwise ranking order. Each round of iteration applies a weight distribution of ranking object pairs, yields a ranking result by each ranking candidate, identifies a favored ranking candidate for the round based on the ranking results, and updates the weight distribution to be used in next iteration round by increasing weights of ranking object pairs that are poorly ranked by the favored ranking candidate. The method then infers a target feature set from the favored ranking candidates identified in the iterations.

18 Claims, 4 Drawing Sheets

U.S. PATENT DOCUMENTS

| | | | |
|---|---|---|---|
| 6,226,237 B1 | 5/2001 | Chan et al. | |
| 6,356,637 B1 | 3/2002 | Garnett | |
| 6,408,257 B1 | 6/2002 | Harrington et al. | |
| 6,477,527 B2 | 11/2002 | Carey et al. | |
| 6,601,049 B1 | 7/2003 | Cooper | |
| 6,611,823 B1 | 8/2003 | Selmic et al. | |
| 6,662,470 B2* | 12/2003 | Ellis, III | 36/25 R |
| 6,751,600 B1 | 6/2004 | Wolin | |
| 6,945,869 B2 | 9/2005 | Kim et al. | |
| 6,951,515 B2 | 10/2005 | Ohshima et al. | |
| 6,999,083 B2 | 2/2006 | Wong et al. | |
| 7,001,272 B2 | 2/2006 | Yamashita et al. | |
| 7,024,033 B2* | 4/2006 | Li et al. | 382/159 |
| 7,050,078 B2 | 5/2006 | Dempski | |
| 7,099,745 B2 | 8/2006 | Ebert | |
| 7,138,963 B2 | 11/2006 | Hobgood et al. | |
| 7,162,054 B2 | 1/2007 | Meisner et al. | |
| 7,197,497 B2 | 3/2007 | Cossock | |
| 7,318,051 B2 | 1/2008 | Weston et al. | |
| 7,369,869 B2* | 5/2008 | Wiatrowski et al. | 455/518 |
| 7,398,093 B2 | 7/2008 | Hull et al. | |
| 7,446,772 B2 | 11/2008 | Wong et al. | |
| 7,526,101 B2* | 4/2009 | Avidan | 382/103 |
| 7,707,163 B2 | 4/2010 | Anzalone et al. | |
| 7,805,438 B2* | 9/2010 | Liu et al. | 707/723 |
| 7,844,085 B2* | 11/2010 | Lu et al. | 382/118 |
| 2002/0010734 A1 | 1/2002 | Ebersole et al. | |
| 2002/0123977 A1 | 9/2002 | Raz | |
| 2002/0167536 A1 | 11/2002 | Valdes et al. | |
| 2003/0002731 A1 | 1/2003 | Wersing et al. | |
| 2004/0111388 A1 | 6/2004 | Boiscuvier et al. | |
| 2004/0136471 A1 | 7/2004 | Pao et al. | |
| 2004/0193441 A1 | 9/2004 | Altieri | |
| 2004/0225483 A1 | 11/2004 | Okoniewski et al. | |
| 2005/0049913 A1* | 3/2005 | Huddleston et al. | 705/11 |
| 2005/0144149 A1* | 6/2005 | Li et al. | 706/12 |
| 2005/0234953 A1 | 10/2005 | Zhang et al. | |
| 2005/0246328 A1 | 11/2005 | Zhang et al. | |
| 2005/0280661 A1 | 12/2005 | Kobayashi et al. | |
| 2006/0013473 A1 | 1/2006 | Woodfill et al. | |
| 2006/0038833 A1 | 2/2006 | Mallinson et al. | |
| 2006/0047704 A1 | 3/2006 | Gopalakrishnan | |
| 2006/0105838 A1 | 5/2006 | Mullen | |
| 2006/0110028 A1* | 5/2006 | Liu et al. | 382/159 |
| 2006/0126740 A1 | 6/2006 | Lin et al. | |
| 2006/0136411 A1 | 6/2006 | Meyerzon et al. | |
| 2006/0149883 A1 | 7/2006 | Benbow et al. | |
| 2006/0224532 A1* | 10/2006 | Duan et al. | 706/15 |
| 2006/0262140 A1 | 11/2006 | Kujawa et al. | |
| 2006/0294059 A1 | 12/2006 | Chamberlain et al. | |
| 2007/0035562 A1 | 2/2007 | Azuma et al. | |
| 2007/0038944 A1 | 2/2007 | Carignano et al. | |
| 2007/0073749 A1* | 3/2007 | Fan | 707/101 |
| 2007/0110298 A1 | 5/2007 | Graepel et al. | |
| 2007/0132785 A1 | 6/2007 | Ebersole, Jr. et al. | |
| 2007/0162448 A1 | 7/2007 | Jain et al. | |
| 2007/0233679 A1 | 10/2007 | Liu et al. | |
| 2007/0244884 A1 | 10/2007 | Yang | |
| 2008/0004865 A1* | 1/2008 | Weng et al. | 704/9 |
| 2008/0018668 A1 | 1/2008 | Yamauchi | |
| 2008/0027912 A1* | 1/2008 | Liu et al. | 707/3 |
| 2008/0027925 A1* | 1/2008 | Li et al. | 707/5 |
| 2008/0033939 A1 | 2/2008 | Khandelwal | |
| 2008/0060034 A1 | 3/2008 | Egnal et al. | |
| 2008/0097938 A1 | 4/2008 | Guyon et al. | |
| 2008/0126275 A1* | 5/2008 | Crnojevic et al. | 706/13 |
| 2008/0140589 A1* | 6/2008 | Basu et al. | 706/12 |
| 2008/0150963 A1 | 6/2008 | Stambaugh | |
| 2009/0157571 A1* | 6/2009 | Smith et al. | 706/12 |
| 2009/0265290 A1* | 10/2009 | Ciaramita et al. | 706/12 |
| 2009/0287620 A1* | 11/2009 | Xu | 706/12 |
| 2009/0287621 A1* | 11/2009 | Krupka et al. | 706/12 |

OTHER PUBLICATIONS

De Fuentes, "A Parallel Programming Model for a Multi-FPGA Multiprocessor Machine", Thesis, University of Toronto, 2006, pp. 1-pp. 89.

Dillinger et al., "FPGA Based Real-Time Image Segmentation for Medical Systems and Data Processing", IEEE, 2005, pp. 161-pp. 165.

Eick et al., "Hardware Accelerated Algorithms for Semantic Processing of Document Streams", IEEE Aerospace Conference, Big Sky, MT, Mar. 4-11, 2006, pp. 1-pp. 14.

McGettrick et al., "Searching the Web with an FPGA based Search Engine", ARC 2007, LNCS 4419, pp. 350-pp. 357.

Xilinx, Virtex-II Pro FPGAs: The Highest System Performance; The Lowest System Cost, Product Brochure, 2004, pp. 1-pp. 2.

Aryashev, et al., "Parallel FPGA Processor Card for Distributed Information Processing", retrieved on Mar. 7, 2007, at <<http://www.niisi.ru/old/pap_for.htm>>, pp. 1-11.

Burges, et al, "Learning to Rank with Nonsmooth Cost Functions", retrieved at <<http://research.microsoft.com/~cburges/papers/lambdarank.pdf>>, 2006, Microsoft, pp. 1-8.

Farber, et al, "Parallel Neural Network Training on Multi-Spert", retrieved at <<http://ieeexplore.ieee.org/iel4/5245/14210/00651531.pdf?tp=&isnumber=14210&arnumber=651531>>, IEEE, 1997, pp. 659-666.

"Fpga-Press-3x: Data/ Image compression PCI -Board", available at least as early as Mar. 6, 2007, at <<www.gemac-chemnitz.de/all_pdf_files/fpga-board-flyer.pdf>>, pp. 1-2.

Huang, et al, "Improving the Back Propagation Learning Speed with Adaptive Neuro-Fuzzy Technique", retrieved at <<http://ieeexplore.ieee.org/iel4/5797/15470/00714328.pdf?tp=&isnumber=15470&arnumber=714328>>, IEEE, 1993, pp. 2897-2900.

Joachims, "Optimizing Search Engines Using Clickthrough Data," retreived at http://www.cs.cornell.edu/People/tj/publications/joachims_02c.pdf, SIGKDD 02, Edmonton, Alberta, Canada, 2002, 10 pgs.

Lemoine, et al., "Run Time Reconfiguration of FPGA for Scanning Genomic DataBases", retrieved on Mar. 7, 2007, at <<doi.ieeecomputersociety.org/10.1109/FPGA.1995.477414>>, IEEE, 1995, pp. 1-2.

Li, et al, "Learning to Rank Using Classification and Gradient Boosting", retrieved at <<http://research.microsoft.com/~cburges/papers/BoostTreeRank.pdf>>, Microsoft, 2007, pp. 1-10.

Littlefield, "Board vendor FPGA toolkits make or break your project", available at least as early as Mar. 6, 2007, at <<www.cwcembedded.com/documents/contentdocuments/Article-MES-August-2006.pdf>>, Military Embedded Systems, 2006, pp. 1-4.

Melnik et al, "Concave Learners for Rankboost," retreived at <<http://jmlr.csail.mit.edu/papers/volume8/melnik07a/melnik07a.pdf>>, Journal of Machine Learning Research, Apr. 25, 2007, pp. 791-812.

Raykar, et al, "A Fast Algorithm for Learning a Ranking Function from Large Scale Data Sets", retrieved at <<http://www.umiacs.umd.edu/users/vikas/publications/raykar_PAMI_2007.pdf>>, IEEE, Aug. 22, 2007, pp. 0-29.

Torresen, et al, "A Review of Parallel Implementations of Backpropagation Neural Networks", retrieved at <<http://ifi.uio.no/~jimtoer/chp2.ps>>, Chapter 2 in the book by N. Sundararajan and P. Saratchandran (editors): Parallel Architectures for Artificial Neural Networks, IEEE CS Press, 1998, pp. 41-118.

Usunier et al, "Boosting Weak Ranking Functions to Enhance Passage Retrieval for Question Answering," retrieved at <<http://eprints.pascal-network.org/archive/00000428/02/BosWRF2EPR_IR4QA04.pdf>>, SIGIR 2004, Jul. 25-29, 2004, Sheffield, England, 6 pgs.

Xu et al, "FPGA-based Accelerator Design for RankBoost in Web Search Engines," retrieved at <<http://www.doc.ic.ac.uk/~wl/teachlocal/cuscomp/papers/fpt07nx.pdf>>, IEEE, 2007, 8 pgs.

Cuenca et al., "Reconfigurable Frame-Grabber for Real-Time Automated Visual inspection (RT-AVI) Systems", FPL2001, LNCS 2147, 2001, pp. 223-pp. 231.

Ghoting et al., "A Characterization of Data Mining Algotiyhms on a Modern Processor", Proceeding of the First International Workshop on Data Management on New Hardware (DaMon 2005), Jun. 12, 2005, Baltimore MD, pp. 1-pp. 6.

Mutlu et al., "Address-Value Delta (AVD) Prediction: A Hardware Technique for Efficiently Parallelizing Depending Cache Misses", IEEE Transactions on Computers, vol. 55, No. 12., 2006, pp. 1491-pp. 1508.

Nair et al., "An FPGA-Based People Detection System", EURASIP Journal on Applied Signal Processing 2005:7, pp. 1047-pp. 1061.

Final Office Action for U.S. Appl. No. 11/737,605, mailed on Jun. 9, 2011, "Field-Programmable Gate Array Based Accelerator System".

Vu et al., "Using RankBoost to Compare Retrieval Systems", CIKM 2005, Proceeding of the 14th ACM International Conference in Information and Knowledge Management, 2005, pp. 309-pp. 310.

Akesson et al., "Augmented Virtuality: A Method to Automatically Augment Virtual Worlds with Video Images", Abstract, Preface and Table of Contents for Master Thesis at Swedish Institute of Computer Science, Nov. 1997, full text found at http://www.sics.se/~kalle/projects/Master_Thesis/Index.html., 5 pgs.

Billinghurst et al., "Collaborative Mixed Reality", In Proceedings of the 1st Intl Symposium on Mixed Reality (ISMR 99), Japan, Mar. 1999, 16 pgs.

Fischer, et al., "Stylized Augmented Reality for Improved Immersion". <<http://www.gris.uni-tuebingen.de/people/staff/bartz/Publications/paper/vr2005.pdf>> Last accessed on Aug. 17, 2007.

Julier, et al., "Information Filtering for Mobile Augmented Reality". Jul. 2, 2002. <<http://www.ait.nrl.navy.mil/3dvmel/papers/j_IEEECGA02.pdf>>.

McElligott et al., "ForSe FIElds—Force Sensors for Interactive Environments", Lecture Notes in Computer Science, UbiComp 2002: Ubiquitous Computing, 4th Intl Conf, Sweden Sep. 2002, vol. 2498, 8 pgs.

Muir, "Virtual Reality vs Composite Reality" Blog, retrieved on Jun. 6, 2007, at http://citrite.org/blogs/jeffreymuir/2007/02/22/virtual-reality-vs-composite-reality/, Feb. 22, 2007, 3 pages.

Piekarski et al., "ARQuake: The Outdoor Augmented Reality Gaming System", Communications of the ACM, vol. 45, No. 1, Jan. 2002, pp. 36-38.

Rose et al., "Annotating Real-World Objects Using Augmented Reality", Computer Graphics: Developments in Virtual Environments (Proc. CG Intl 95 Conf), Jun. 1995, 21 pgs.

Sestito, et al., "Intelligent Filtering for Augmented Reality". <<www.siaa.asn.,au/get/2395365383.pdf>> Last accessed on Aug. 17, 2007.

Simsarian et al., "Windows on the World: An Example of Augmented Virtuality", retrieved on Jun. 6, 2007 and found at http://www.sics.se/~kalle/published/wow.pdf, 7 pages.

Teitel, "The Eyephone: A Head-Mounted Stereo Display", Abstract, Proceedings of SPIE, Sep. 1990, Stereoscopic Displays and Applications, vol. 1256, 2 pgs.

Wikipedia, "Augmented Virtuality", retrieved on Jun. 6, 2007, at http://en.wikipedia.org/wiki/Augmented_virtuality, 1 pg.

Wikipedia, "EyeToy", retrieved on Jun. 6, 2007, found at http://en.wikipedia.org/wiki/EyeToy, 5 pages.

* cited by examiner

AUTOMATED FEATURE SELECTION BASED ON RANKBOOST FOR RANKING

RELATED APPLICATIONS

This application claims priority to U.S. patent application Ser. No. 11/737,605 (now U.S. Pat. No. 8,117,137) entitled "FIELD-PROGRAMMABLE GATE ARRAY BASED ACCELERATOR SYSTEM", filed on Apr. 19, 2007, which application is hereby incorporated by reference in its entirety.

BACKGROUND

In information retrieval, ranking is of central importance. Ranking is usually done by applying a ranking function (a ranker) onto a set of objects (e.g., documents) to compute a score for each object and sort the objects according to the scores. Depending on applications the scores may represent the degrees of relevance, preference, or importance. Traditionally only a small number of strong features (e.g., BM25 and language model) were used to represent relevance (or preference and importance) to rank documents. In recent years, with the development of the supervised learning algorithms such as Ranking SVM and RankNet, it has become possible to incorporate more features (strong or weak) into ranking models. In this situation, feature selection has become an important issue, particularly from the following viewpoints.

Learning to rank for web search relevance largely depends on the document feature set that is used as training input. First, the trained model is bound to be biased by the choice of features. The feature selection may significantly affect the accuracy of the ranking. For example, although the generalization ability of Support Vector Machines (SVM) depends on the margin which does not change with the addition of irrelevant features, it also depends on the radius of training data points, which can increase when the number of features increases. Moreover, the probability of over-fitting also increases as the dimension of feature space increases, and feature selection is a powerful means to avoid over-fitting. Secondly, the dimension of the feature set also determines the computational cost to produce the model. In the case where not all features in the set are carefully hand-designed, it is even more important to select a feature set of manageable size that can produce a ranking with good performance.

For example, MSN Live Search employs RankNet for ranking, with document features as input. The more features it employs, the more time consuming it is to train a ranking model. In addition, the presence of weak features may have the adverse effect of over-fitting the model. Especially, there is a high chance of such occurrence when the feature set includes a large number of low-level features, as is presently the case. Therefore, it is very important to select a good set of features for RankNet training.

FIG. 1 is a block diagram showing an example of an existing feature selection procedure. Currently, the feature selection is done manually as represented in manual feature selection 110. A training data set 102 is used for manual feature selection 110. Through human decisions (112), a set of features (114) is chosen and passed through RankNet training process 116. The resultant RankNet model 118 is then fed to an automated evaluation tool (120) to determine its performance. Typically NDCG (Normalized Discounted Cumulative Gain) is used as the performance measure. Based on the performance, a decision (122) is made to either further tune the feature set or output a satisfactory selected feature set 130. To further tune the feature set, the process returns to block 112 repeat the decision process, again manually.

The output selected feature set 130 is input to a RankNet training process 140, which also uses training data 102. Input transformation block 142 transfers the selected feature set 130 into input features 144 for RankNet training engine 146, which outputs a RankNet model 148 to be used as a ranking function to rank objects (e.g., documents).

The above menus feature selection 110 is a tedious, time-consuming process that requires a lot of intuition and experience. Even an experience trainer might spend several weeks to tune a feature set and still not sure whether the tuning is successful. It becomes an even greater problem as training data are constantly updated, often adding new features to be evaluated.

SUMMARY

Disclosed is a method using a RankBoost-based algorithm to automatically select features for further training of a ranking model. The method reiteratively applies a set of ranking candidates to a training data set comprising a plurality of ranking objects having a known pairwise ranking order. In each round of iteration, a weight distribution of ranking object pairs is applied, and each ranking candidate yields a ranking result. The method identifies a favored ranking candidate for the current round based on the ranking results, and updates the weight distribution to be used in the next iteration by increasing weights of ranking object pairs that are poorly ranked by the favored ranking candidate. The method then infers a target feature set from the favored ranking candidates identified in a certain number of iterations. In one embodiment, the favored ranking candidate is the best performing ranking candidate in the iteration round.

In some embodiments, the ranking candidates are derived from an initial set of ranking features. The ranking candidates may be derived from the associated ranking feature(s) based on either a linear ranker scheme or threshold ranker scheme. Each ranking candidate is associated with one or more ranking features. In one embodiment each ranking candidate is associated with a single ranking feature and is defined by the single ranking feature and a threshold parameter. To infer a target feature set from the favored ranking candidates, the method selects the ranking features associated with the favored ranking candidates and includes them in the target feature set.

The method may be computer implemented with one or more computer readable media having stored thereupon a plurality of instructions that, when executed by a processor, causes the processor to perform the procedures described herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
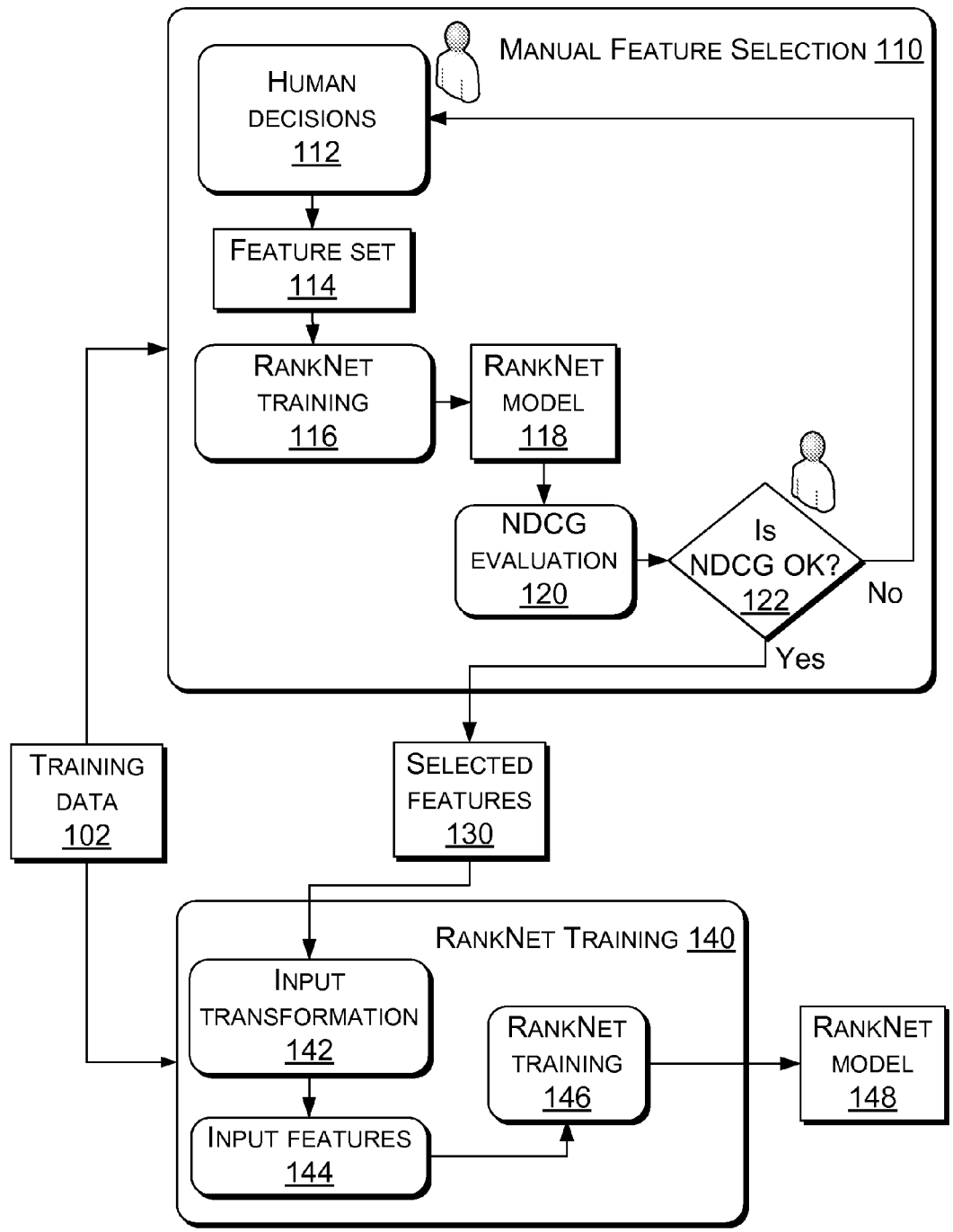
FIG. 1 is a block diagram showing an example of an existing feature selection procedure.

The automated feature selection based on RankBoost algorithm for ranking is described below with an overview of the processes followed by a further detailed description of the exemplary embodiments. In this description, the order in which a process is described is not intended to be construed as a limitation, and any number of the described process blocks may be combined in any order to implement the method, or an alternate method. In this description, a ranking model has a trained (or modeled) ranking function or ranker. Terms such as "ranking function" and "ranker" are used interchangeably unless noted otherwise.

Disclosed is an automated approach for feature selection using RankBoost ranking algorithm. RankBoost is a boosting algorithm, which is based on the idea that a number of weak rankings can be combined to form a single strong ranking. For example, in ranking movies, each individual reviewer's ranked list of movies may not be a comprehensive detailed listing of all movies, but instead a simple partition of movies into two groups according to whether or not the reviewer prefers the movies over a particular movie that appears on the reviewer's list. That is, an individual reviewer's ranking is in itself a weak ranker. Using RankBoost algorithm, many weak rankers may be combined to form a strong ranker to give a more complete and more detailed ranking.

Further detail of an exemplary embodiment of RankBoost algorithm is provided in a later section of the present description.

RankBoost algorithm has been used for training a strong ranking model based on a selected feature set. The method disclosed herein, however, is a nonconventional use of Rank-Boost algorithm to select a feature set from a large initial set of features.

The disclosed method runs RankBoost in iteration. In each round, a weak ranker is chosen from a set of candidates to maximize a performance gain function. The final model is a weighted linear combination of the weak rankings selected over the iteration. When applied on the relevance ranking problem, document features are taken as weak ranker candidates. The RankBoost-trained model is thus viewed as a set of selected features which, in combination, maximizes the performance gain function. The RankBoost-trained model thus provides a basis for automated feature selection.

The RankBoost algorithm is developed based on the preference concept. It operates on document pairs where one document in the pair is valued (ranked) higher than the other. Weights are assigned to each of these pairs to indicate how important it is that the pair is ordered correctly, and the goal is to minimize such weighted pair-wise errors.

One embodiment of the disclosed method is a computer implemented method used in a ranking algorithm. The method reiteratively applies a set of ranking candidates to a training data set which includes a plurality of ranking objects having a known pairwise ranking order. A ranking candidate is a candidate ranking function or ranker. In each iteration round, a weight distribution of ranking object pairs is applied, and each ranking candidate yields a ranking result. A favored (preferred) ranking candidate is then identified based on the ranking results, and the weight distribution is updated to be used in next iteration by increasing weights of ranking object pairs that are poorly (or incorrectly) ranked by the favored ranking candidate. The method finally infers a target feature set from the favored ranking candidates identified in the iteration rounds.

The favored ranking candidates are preferentially selected by the algorithm based on the performance of the ranking candidates. In one embodiment, the favored ranking candidate is the best performing ranking candidate that gives minimum pairwise error in that round. As will be illustrated in further detail herein, ranking candidates may be derived from an initial set of candidate ranking features, preferably as weak rankers which have a simple ranking function. Each round of RankBoost iteration chooses from a set of weak ranking candidates the weak ranker h that gives minimum pair-wise error, given the current weight distribution. The distribution is then adjusted by increasing the weight of the pairs that are incorrectly ordered by h.

The weight distribution may be an n×n matrix $d_{ij}$ in which n is the number of documents and $d_{ij}$ is a scaled number measuring the importance of having the order between document i and document j right. In the disclosed feature selection method, the weight distribution matrix $d_{ij}$ is updated at the end of each iteration round by increasing the values of those $d_{ij}$ elements which are incorrectly ordered by the favored ranking candidate selected in the present iteration round. With this adjustment, in the next round, the algorithm will favor weak rankers that correctly order those pairs, thus acting as a complement to the weak rankers selected so far.

The final model H is a linear combination of the selected favored weak rankers in the following form:

$$H(x) = \sum_{t=1}^{T} \alpha_t h_t(d), \quad (1)$$

where T is the number of iteration rounds, d refers to a document (ranking object), and $h_t$ denotes the weak ranker selected at round t. The scaling coefficient $\alpha_t$ is calculated from the pair-wise error of the ranking that $h_t$ produces.

In one embodiment, the ranking candidates are derived from an initial set of ranking features, which are the pool of potential ranking features from which a target feature set is to be selected. Each ranking candidate so constructed is associated with one or more ranking features. Based on this association, a target feature may be inferred from the ranking candidates appears in a combination of ranking features that constitutes a trained strong ranker, as expressed in the above equation (1).

In the context of relevance ranking, for example, ranking candidates can be derived from document features using two different schemes. In the linear ranker scheme, h(d) takes the feature value directly, and ranking documents translates to sorting the documents in a decreasing order of feature values. In the threshold (binary) ranker scheme, h(d) assigns the value 0 or 1 to a document depending on whether its feature value is less than or greater than a chosen threshold. In general, the threshold ranker scheme provides a larger pool of weak ranking candidates.

Various forms of weak rankers, such as that proposed in Y. Freund, et al., An Efficient Boosting Algorithm for Combining Preferences, *Journal of Machine Learning*, 4:933-969, 2003, may be used. For low complexity and good ranking quality, the following exemplary weak ranker may be used:

$$h(d) = \begin{cases} 1 & \text{if } f_i(d) > \theta \\ 0 & \text{if } f_i(d) \leq \theta \text{ or } f_i(d) \text{ is undefined} \end{cases} \quad (2)$$

where $f_i(d)$ denotes the value of featured $f_i$ for document d, and $\theta$ is a threshold value.

A weak threshold ranker in the above example is thus defined by two parameters: a feature $f_i$, and a threshold $\theta$. As shown in the above equation (2), a weak ranker h(d) can only output a discrete value 0 or 1.

Some features may have a complex function instead of a simple threshold output. Such complex features usually cannot be sufficiently represented by just one weak ranker. Instead, multiple thresholds $\theta$ are needed for expressing each complex feature. The values of the features may be normalized to [0, 1] and then divided into bins with a number of thresholds, for example, 128, 256, 512, or 1024 different thresholds. These different thresholds correspond to a family of ranking candidates which share a common feature. Different features then give rise to different families of ranking features. In other words, the set of ranking candidates may include multiple subsets of ranking candidates, and the ranking candidates of each subset are derived from a common ranking feature and differ from one another by each having a different threshold parameter.

When weak rankers are derived from the features according to the above equation (2), each feature is thus associated with multiple weak rankers. Because a complex feature cannot be sufficiently expressed by a single weak ranker, the algorithm may keep selecting a weak ranker associated with this feature and different thresholds in order to fully express the information of the feature. As a result, through the multiple runs of iteration, an individual feature may be selected multiple times.

On the other hand, when weak rankers are derived from the features according to the above equation (2), each weak ranker corresponds to only one feature. This correspondence is a basis for eventually inferring selected features from the selected weak rankers.

However, the above particular correspondence is true only for the above illustrated weak ranker design. More complex designs of weak rankers may be used in which one weak ranker may correspond to multiple features.

A weak ranker could have a different or more complex form than the above "threshold" weak ranker. Examples include:

$h_i(d)=f_i$, which may be referred to as weak linear rankers;

$h_i(d)=\log(f_i)$, which may be referred to as weak log rankers; and $h_{ij}(d)=f_i*f_j$, which may be referred to as weak conjugate rankers, in which one weak ranker corresponds to two features (and accordingly, two features are implied when this weak ranker is selected by the RankBoost algorithm.)

Weak threshold rankers as represented in equation (2) are preferred because they have the ability to express a very complex trend of one feature by combining different weak threshold rankers that are associated with the same feature and different thresholds. In addition, weak threshold rankers are found to have better generalization ability than the weak linear ranker.

The following is an example for inferring features from favored rankers when candidate rankers are weak threshold rankers h(d) in equation (2). Suppose RankBoost algorithm has selected favored weak rankers as follows:

Round0: favored ranker with feature=15, threshold=3, and alpha=0.7

Round1: favored ranker with feature=7, threshold=18, and alpha=0.4

Round2: favored ranker with feature=15, threshold=9, and alpha=−0.2

Round3: favored ranker with feature=163, threshold=3, and alpha=0.5

Round4: favored ranker with feature=15, threshold=200, and alpha=0.6

Round5: favored ranker with feature=1, threshold=17, and alpha=0.3

In the above six rounds, the RankBoost algorithm has selected six favored weak rankers, and four individual features (feature id=15, 7, 163, and 15). In the ranking model H(d), feature 15 has a more complex trend than others because it has been expressed the most frequently, suggesting that feature 15 is a more expressive feature.

In practice, far more than six rounds of iteration may be carried out. It is found that in general, as the number of iteration rounds increases, the algorithm continues to select new features out of the whole set of features. This may be explained by the fact that for a certain training set, RankBoost has a theoretical ability to rank all training data correctly (i.e., with the error rate approaching 0) given that the features are expressive enough. However, not every iteration round adds a new feature, and further the speed of adding new features tends to slow down as the number of iteration rounds increases. In one experiment, for example, with an initial whole set of over 1000 features, about 130 features (slightly over 10% of the total) were selected after 2000 rounds of RankBoost selecting threshold-based weak rankers, and about 150 features were selected after 5000 rounds of RankBoost selecting linear weak rankers.

In addition, increasing the number of iteration rounds generally improves the quality of the feature set initially, but does not result in unlimited improvement. The resultant feature set can be tested using training on either 1-layer network or 2-layer network which measures the relevance and the validity of the feature set by its NDCG performers. As the number of iteration rounds increases, the NDCG performers generally improves first but tends to become flat after a certain point (e.g., 5000 rounds), suggesting that before the error rate approaches zero, the model may start to be over-fitting. For the foregoing reasons, the point to stop the iteration may be determined empirically.

The initial feature set is usually the whole set of features that are available. In practice, when a new feature is designed, the whole set may be updated to add the new feature. The automated feature selection also acts as a test for the newly designed future. An effectively designed new feature may be quickly picked up by the automated feature selection and thus become a part of the selected feature set which is further trained and used for actual ranking by the search engines. If the new feature is not selected by the automated feature selection algorithm at all after a certain number of attempts, the feature may be added to a black list, which will guide RankBoost algorithm not to waste time checking the feature.

To find the best performing h(d), all possible combinations of feature $f_i$ and threshold $\theta_s$ are checked. This can become a computationally expensive process. Special algorithms and hardware disclosed in U.S. patent application Ser. No. 11/737,605 entitled "FIELD-PROGRAMMABLE GATE ARRAY BASED ACCELERATOR SYSTEM", may be used to speed up this computation process.

Figure 2:
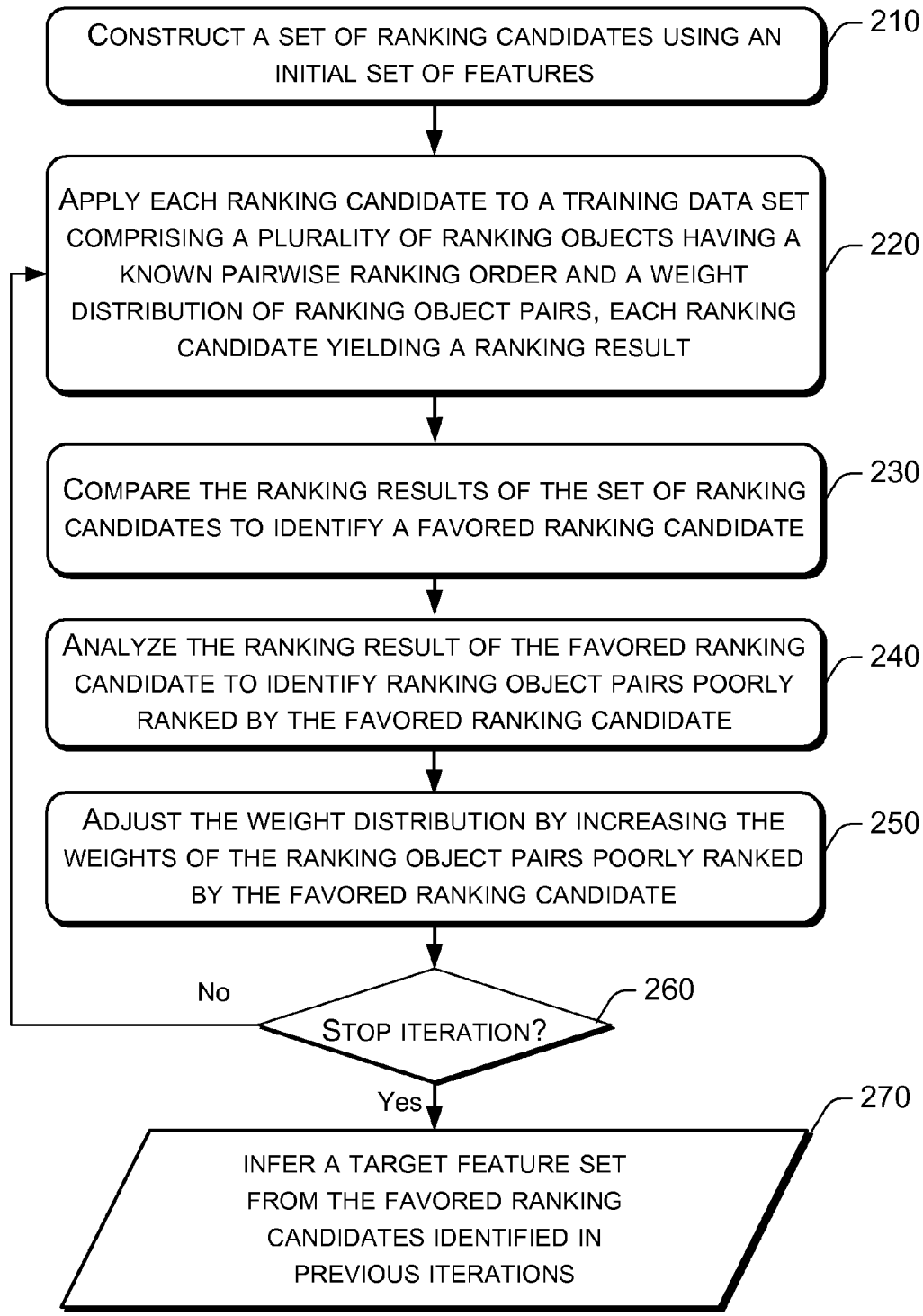
FIG. 2 is a flowchart of an exemplary automated process of feature selection.

FIG. 2 is a flowchart of an exemplary automated process of feature selection. The major components of the feature selection process 200 are described as follows.

Block 210 constructs a set of ranking candidates using an initial set of features.

Block 220 applies each ranking candidate to a training data set comprising a plurality of ranking objects having a known pairwise ranking order and a weight distribution of ranking object pairs. Each ranking candidate yields a ranking result.

Block 230 compares the ranking results of the set of ranking candidates to identify a favored ranking candidate.

Block 240 analyzes the ranking result of the favored ranking candidate to identify ranking object pairs poorly ranked by the favored ranking candidate.

Block 250 adjusts the weight distribution by increasing the weights of the ranking object pairs poorly ranked by the favored ranking candidate.

Block 260 determines whether the iteration should be stopped. The stop point may be selected empirically. For example, a certain target number of iteration rounds chosen based on the empirically experience may be built in the Rank-Boost algorithm to stop the iteration when the target number of iteration rounds is reached. The iteration may also be stopped manually. Before the iteration stops, the feature selection process 200 returns to block 220 two repeat the procedure of blocks 220-250. Each iteration identifies a favored (e.g., best performing) ranking candidate.

Block 270 infers a target feature set from the favored ranking candidates identified in previous iterations. The inferred target feature set is then used for further training to obtain a final ranking function.

Figure 3:
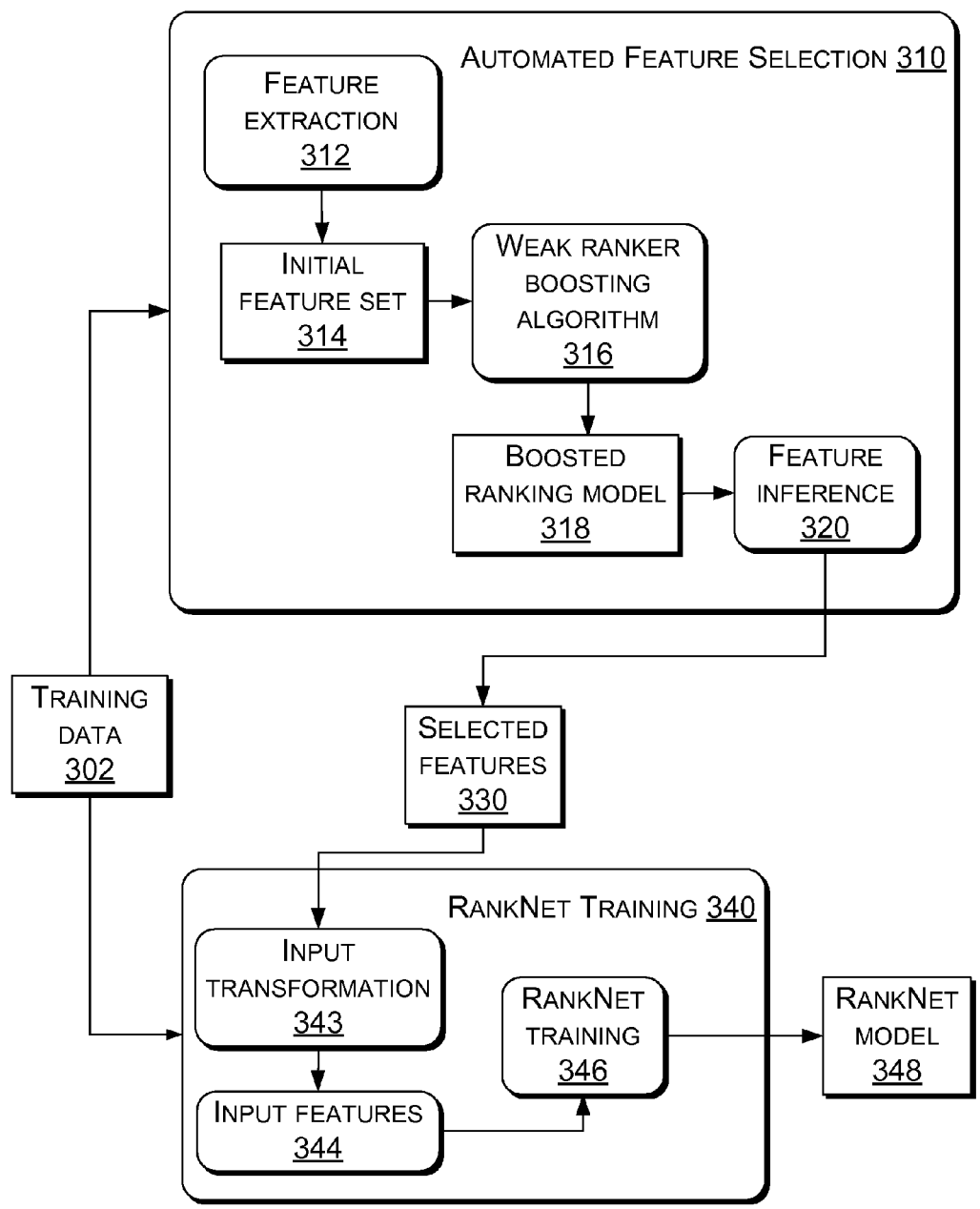
FIG. 3 is a block diagram showing an exemplary process of automated feature selection which provides selected features for further training of a ranking model.

FIG. 3 is a block diagram showing an exemplary process of automated feature selection which provides selected features for further training of a ranking model. As shown, automated feature selection 310 includes feature extraction block 312, with which features are extracted from one or more suitable sources. Features may be extracted from training data 302, but may also be provided independently. The result of feature extraction or collection is an initial feature set 314, which may in practice a large feature set including, for example, over a thousand features. The initial feature set 314 is input to a weak ranker boosting algorithm 316 (e.g., RankBoost algorithm), resulting in a boosted ranking model 318, which may be, as illustrated herein, a linear combination of the weak rankers selected by the weak ranker boosting algorithm 316. Feature inference block 320 infers features from the boosted ranking model 318. The detail of automated feature selection 310 has been illustrated with the previously described processes, and particularly with reference to FIGS. 1-2.

Automated feature selection 310 results in a set of selected features 330 which is further trained by a training process 340. The training can be done using any suitable algorithms, including RankNet, LambaRank, and RankBoost. FIG. 3 shows a training process 340 based on RankNet, without losing generality. Block 343 represents an input transformation process in which the set of selected features 330 is transformed into input features 344 to be fed to RankNet training engine 346. The output of the RankNet training process 340 is a RankNet model 348, which can be used by a search engine for actual rankings of search results.

The method described herein is capable of automatically selecting features for a ranking algorithm. Conventional training techniques require extensive manual selection of features in which a human trainer tunes the feature set according to the results of a lot of training experiments with various feature combinations. The presently disclosed method greatly simplifies the workflow of feature selection, saving time and effort. Furthermore, the entire RankNet training can now be automated. The automated feature selection is also able to yield good performance to justify replacing manual selection with the automation.

RankBoost algorithm is uniquely applied in the automatic feature selection method disclosed herein. Studies conducted using the disclosed method suggest that the automated feature selection based on the RankBoost algorithm has a great potential to improve not only the efficiency of training, but also the search relevance.

In addition, the automated feature selection may be further accelerated by an FPGA-based accelerator system for the automated feature selection. An exemplary accelerator system is described in U.S. patent application Ser. No. 11/737,605 entitled "FIELD-PROGRAMMABLE GATE ARRAY BASED ACCELERATOR SYSTEM". In one embodiment, the FPGA-based accelerator system can accelerate the feature selection software for nearly 170 times.

The automated feature selection may be further enhanced using a distributed software system, also described in the above referenced US patent application. The distributed software system is able to support much bigger data set than what an FPGA-based accelerator can usually support.

Figure 4:
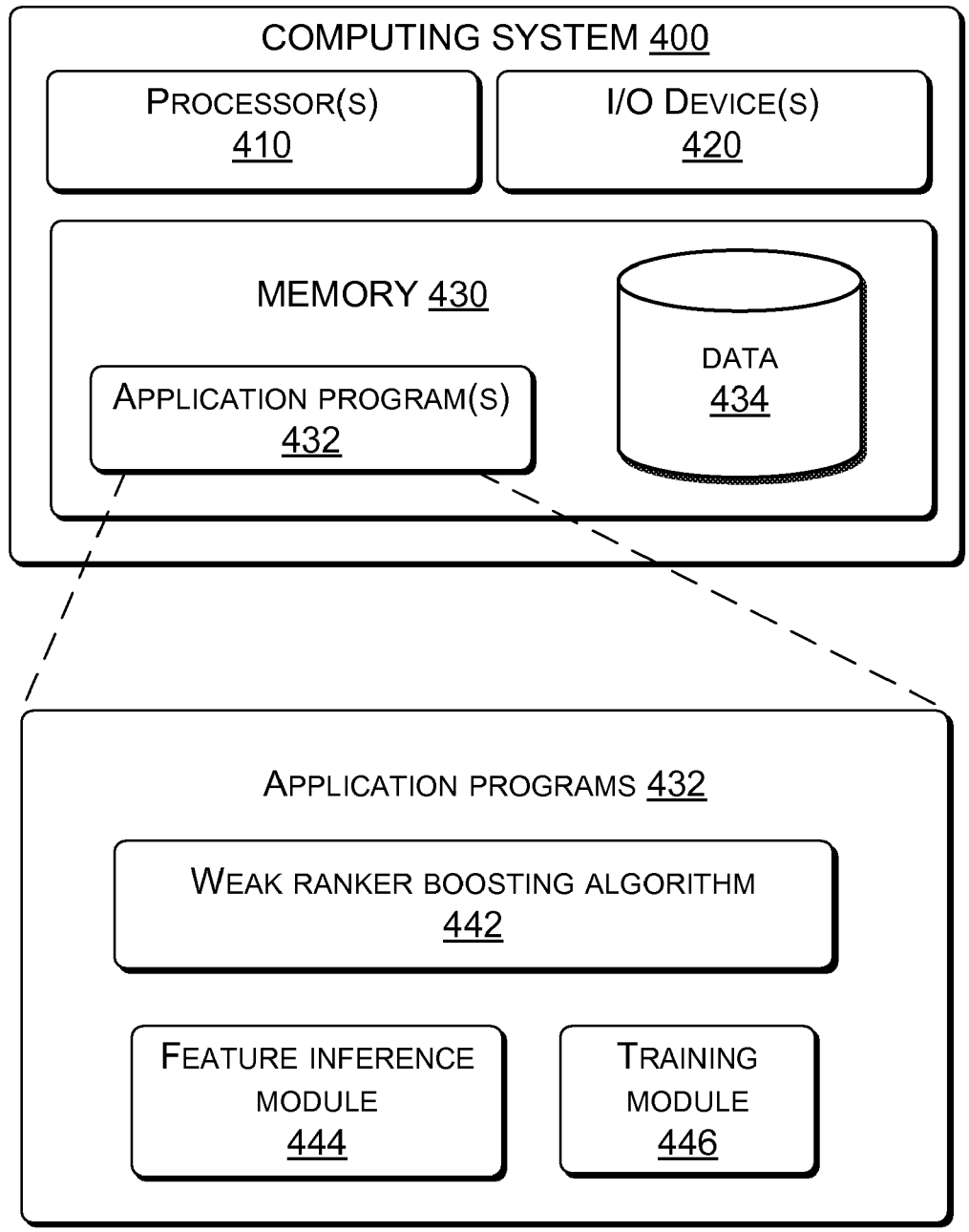
FIG. 4 is a block diagram of a computer system implementing the automated feature selection of the present disclosure.

FIG. 4 is a block diagram of a computer system implementing the automated feature selection of the present disclosure. The computer system 400 includes processor(s) 410, I/O devices 420 and computer readable media (memory) 430. The computer readable media 430 stores application programs 432 and data 434 (such as features, ranking candidates and training data). Application programs 432 may include several application modules. The examples of such application modules as illustrated include a weak ranker boosting algorithm 442 (such as a RankBoost algorithm) to obtain a boosted ranking model from combined selected weak rankers, a feature inference module 444 to infer a selected feature set from the boosted ranking model, and a training module 446 to train a ranking function based on the selected feature set. These application modules in the application programs 432 may together contain instructions which, when executed by processor(s) 410, cause the processor(s) 410 to perform actions of a process described herein (e.g., the illustrated processes of FIGS. 2-3).

An exemplary process that can be performed by the weak ranker boosting algorithm 442 is a to reiteratively apply a set of ranking candidates to a training data set comprising a plurality of ranking objects having a known pairwise ranking order. In each iteration round, a weight distribution of ranking object pairs is applied, and each ranking candidate yields a ranking result. A favored ranking candidate (e.g., a best-performing ranker) is identified based on the ranking results, and the weight distribution is updated to be used in next iteration by increasing weights of ranking object pairs that are poorly ranked by the favored ranking candidate. The weak ranker boosting algorithm 442 may further prepare the favored ranking candidates identified in the previous iteration rounds for inferring a target feature set therefrom. The feature inference is preferably performed by a feature inference module 444, but can be performed separately or even manually.

It is appreciated that a computing system may be any device that has a processor, an I/O device and a computer readable media (either an internal or an external), and is not limited to a personal computer or workstation. Especially, a computer device may be a server computer, or a cluster of such server computers, connected through network(s), which may either be Internet or an intranet.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

Further Detail of RankBoost Algorithm

An exemplary RankBoost algorithm which can be used for the automated feature selection disclosed herein is described in further detail below. Generally, when ranking objects, the goal is to find a ranking function to order the given set of objects. Such an object is denoted as an instance x in a domain (or instance space) X. As a form of feedback, information about which instance should be ranked above (or below) one another is provided for every pair of instances. This feedback is denoted as function $\Phi: X \times X \rightarrow R$, where $\Phi(x_0, x_1) > 0$ means $x_1$ should be ranked above $x_0$, and $\Phi(x_0, x_1) < 0$ means $x_0$ should be ranked above $x_1$. A learner then attempts to find a ranking function $H: X \rightarrow R$, which is as consistent as possible to the given $\Phi$, by asserting $x_1$ is preferred over $x_0$ if $H(x_1) > H(x_0)$.

A relevance-ranking algorithm may be used to learn the ranking function H by combining a given collection of ranking functions. The relevance-ranking algorithm may be pair-based or document-based. The psuedocode for one such relevance ranking algorithm, is shown below:

Initialize: Distribution D over X×X
Do for t=, . . . , T:
   (1) Train WeakLearn using distribution $D_t$.
   (2) WeakLearn returns a weak hypothesis $h_t$.
   (3) Choose $\alpha_t \in R$
   (4) Update weights: for each pair $(d_0, d_1)$:

$$D_{t+1}(d_0, d_1) = \frac{D_t(d_0, d_1)\exp(-\alpha_t(h_t(d_0) - h_t(d_1)))}{Z_t}$$

where $Z_t$ is the normalization factor:

$$Z_t = \sum_{x_0, x_1} D_t(d_0, d_1)\exp(-\alpha_t(h_t(d_0) - h_t(d_1))).$$

Output: the final hypothesis:

$$H(x) = \sum_{t=1}^{T} \alpha_t h_t$$

The relevance-ranking algorithm is utilized in an iterative manner. In each round, a procedure named "WeakLearn" is called to select the best "weak ranker" from a large set of candidate weak rankers. The weak ranker has the form $h_t$: $X \rightarrow R$ and $h_t(x_1) > h_t(x_0)$ means that instance $x_1$ is ranked higher than $x_0$ in round t. A distribution $D_t$ over X×X is maintained in the training process. Weight $D_t(x_0, x_1)$ will be decreased if $h_t$ ranks $x_0$ and $x_1$ correctly ($h_t(x_1) > h_t(x_0)$), and increased otherwise. Thus, $D_t$ will tend to concentrate on the pairs that are hard to rank. The final strong ranker H is a weighted sum of the selected weak rankers in each round.

The WeakLearn algorithm may be implemented to find the weak ranker with a maximum $r(f, \theta)$, by generating a temporary variable $\pi(d)$ for each document. The WeakLearn algorithm may be defined as follows:

Given: Distribution $D(d_0, d_1)$ over all pairs
Initialize: (1) For each document d(q):

Compute $\pi(d(q)) = \sum_{d'(q)} (D(d'(q), d(q)) - D(d(q), d'(q)))$ (2) For every feature $f_k$ and every threshold $\theta^k_s$:

$$\text{Compute } r(f_k, \theta^k_s) = \sum_{d(q): f_k(d(q)) > \theta^k_s} \pi(d(q))$$

(3) Find the maximum $|r^*(f_{k^*}, \theta_{S^*}^{k^{**}})|$
   (4) Compute:

$$\alpha = \frac{1}{2}\ln\left(\frac{1+r^*}{1-r^*}\right)$$

Output: weak ranking $(f_{k^*}, \theta_{S^*}^{k^{**}})$ and $\alpha$.

To extend the relevance-ranking algorithm to Web relevance ranking, training pairs may be generated and weak rankers may be defined. To generate the training pairs, the instance space for a search engine may be partitioned according to queries issued by users. For each query q, the returned documents may be rated a relevance score, from 1 (means 'poor match') to 5 (means 'excellent match') using a manual or automated process. Unlabeled documents may be given a relevance score of 0. Based on the rating scores (ground truth), the training pairs for the relevance-ranking algorithm may be generated from the returned documents for each query.

So-called "weak rankers" may be defined as a transformation of a document feature, which is a one-dimensional real value number. Document features can be classified into query dependent features, such as query term frequencies in a document and term proximity, and query independent features, such as PageRank, and so forth. Thus, the same document may be represented by different feature vectors for different queries based upon its query-dependent features.

In keeping with the previous algorithm example, a document may be designated as d(q), a pair as $\{d_1(q), d_2(q)\}$, and $d^i_j$ means a document for query $q_i$. The $k_{th}$ feature for document is denoted as $f_k(d^i_j)$. With these notations, an alternative relevance-ranking algorithm may be implemented as follows.

Initialize: initial distribution D over X×X
Given: $N_q$ queries $\{q_i | i=1 \ldots, N_q\}$.
   $N_i$ documents $\{d^i_j | j=1, \ldots, N_i\}$ for each query $q_i$, where $\sum_{i=1}^{N_q} N_i = N_{doc}$.
   $N_f$ features $\{f_k(d^i_j) | j=1, \ldots, N_f\}$ for each document $d^i_j$
   $N^k_\theta$ candidate thresholds $\{\theta^k_s | s=1, \ldots, N^k_\theta\}$ for each $f_k$.
   $N_{pair}$ pairs $(d^i_{j1}, d^i_{j2})$ generated by ground truth rating $\{R(q_i, d^i_j)\}$ or $\{R^i_j\}$.
Initialize: initial distribution $D(d^i_{j1}, d^i_{j2})$ over X×X
Do for t=1, . . . , T:
   (1) Train WeakLearn using distribution $D_t$.
   (2) WeakLearn returns a weak hypothesis $h_t$, weight $\alpha_t$
   (3) Update weights: for each pair $(d_0, d_1)$:

$$D_{t+1}(d_0, d_1) = \frac{D_t(d_0, d_1)\exp(-\alpha_t(h_t(d_0) - h_t(d_1)))}{Z_t}$$

where $Z_t$ is the normalization factor:

$$Z_t = \sum_{x_0, x_1} D_t(d_0, d_1) \exp(-\alpha_t(h_t(d_0) - h_t(d_1))).$$

Output: the final hypothesis:

$$H(x) = \sum_{t=1}^{T} \alpha_t h_t$$

For the relevance-ranking algorithms described by example above, WeakLearn may be defined as a routine that uses the $N_f$ document features to form its weak rankers, attempting to find the one with the smallest pair-wise disagreement relative to distribution D over $N_{pair}$ document pairs. As previously described, an exemplary weak ranker may be defined by the following relationship:

$$h(d) = \begin{cases} 1 & \text{if } f_i(d) > \theta \\ 0 & \text{if } f_i(d) \leq \theta \text{ or } f_i(d) \text{ is undefined} \end{cases}$$

To find the best h(d), the weak learner checks all of the possible combinations of feature $f_i$ and threshold $\theta$. The WeakLearn algorithm may be implemented to ascertain a maximum $r(f, \theta)$ by generating a temporary variable $\pi(d)$ for each document. Intuitively, $\pi$ contains information regarding labels and pair weights, and the weak ranker only needs to access $\pi$ in a document-wise manner for each feature and each threshold, that is $O(N_{doc} N_f N_\theta)$, in a straightforward implementation. Based on this, an alternative weak learner may be utilized using an integral histogram to further reduce the computational complexity to $O(N_{doc} N_f)$. Because of this relatively low computational complexity, the algorithm may be implemented in both software and hardware, e.g., an accelerator system utilizing an FPGA, as described above.

According to the implementation, r may be calculated in $O(N_{doc} N_f)$ time in each round using an integral histogram in $O(N_{doc} N_f)$ time. First, feature values $\{f_k(d)\}$ in a dimension of the whole feature vector $(f_1, \ldots, f_{N_f})$ may be classified into $N_{bin}$ bins. The boundaries of these bins are:

$$\theta_s^k = \frac{f_{max}^k - f_{min}^k}{N_{bin}} \cdot s + f_{min}^k, \quad s = 0, 1, \ldots, N_{bin},$$

where $f_{max}^k$ and $f_{min}^k$ are maximum and minimum values of all $f_k$ in the training data set. Then each document d can be mapped to one of the bins according to the value of $f_k(d)$:

$$Bin_k(d) = \text{floor}\left(\frac{f_k(d) - f_{min}^k}{f_{max}^k - f_{min}^k} \cdot N_{bin} - 1\right)$$

The histogram of $\pi(d)$ over feature $f_k$ is then built using:

$$Hist_k(i) = \sum_{d: Bin_k(d) = i} \pi(d), \quad i = 0, \ldots, (N_{bin} - 1)$$

Then, an integral histogram can be determined by adding elements in the histogram from the right ($i = N_{bin} - 1$) to the left ($i = 0$). That is, $$Integral_k(i) = \sum_{a > i} Hist_k(a), \quad i = 0, \ldots, (N_{bin} - 1)$$

Although the above-described RankBoost algorithm can also be used for performing training of a ranking model with a given set of selected features, the present disclosure takes a unique application angle of the above algorithm. It starts from a given initial feature set to select a feature set as a preparatory stage for further training. The automated feature selection disclosed herein significantly improves the ability to handle a variety of initial feature sets which tend to include a large number of features and also change frequently. With the efficient feature selection tool disclosed herein, feature selection is done and/or updated quickly whenever necessary, and thereafter a final ranking model may be obtained using any suitable rank training algorithms, such as RankNet and LambaRank.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method used in a ranking algorithm, the method comprising:
   reiteratively applying a set of ranking candidates to a training data set comprising a plurality of ranking objects having a known pairwise ranking order, wherein each iteration applies a weight distribution of ranking object pairs, yields a ranking result by each ranking candidate, identifies a favored ranking candidate based on the ranking results, and updates the weight distribution to be used in a next iteration by increasing weights of ranking object pairs that are poorly ranked by the favored ranking candidate, wherein the ranking result is determined based in part on building a histogram and determining an integral histogram associated with the histogram; and
   inferring a target feature set from the favored ranking candidates identified in a plurality of iterations.

2. The method as recited in claim 1, wherein the set of ranking candidates are derived from an initial set of ranking features.

3. The method as recited in claim 2, wherein each ranking candidate is associated with one or more ranking features, and inferring a target feature set from the favored ranking candidates comprises:
   selecting at least some ranking features associated with the favored ranking candidates and including them in the target feature set.

4. The method as recited in claim 2, wherein each ranking candidate is associated with one or more ranking features, and is derived from the associated one or more ranking features based on a linear ranker scheme or based on a threshold ranker scheme.

5. The method as recited in claim 2, wherein each ranking candidate is associated with at least one ranking feature, and inferring a target feature set from the favored ranking candidates comprises:
   selecting the ranking features associated with the favored ranking candidates and including them in the target feature set.

6. The method as recited in claim 1, wherein the set of ranking candidates comprises at least one subset of ranking candidates, and the ranking candidates of each subset are derived from a common single ranking feature and differ from one another by each having a different threshold parameter.

7. The method as recited in claim 1, wherein the favored ranking candidate of each iteration round is identified by selecting a best performing ranking candidate of the iteration round.

8. The method as recited in claim 1, wherein the ranking objects that are poorly ranked by the favored ranking candidate are identified by comparing the ranking result with the known pairwise ranking order of the training data.

9. The method as recited in claim 1, further comprising:
   constructing an output ranking model using a linear combination of the selected favored ranking candidates.

10. The method as recited in claim 9, wherein the target feature set is inferred from the output ranking model.

11. The method as recited in claim 1, wherein the ranking candidates are weak rankers.

12. The method as recited in claim 1, further comprising: stopping iteration at a user chosen stop point.

13. The method as recited in claim 1, further comprising:
   inputting the selected target feature set to a training engine; and
   training the selected target feature set using the training engine to obtain a final ranking model.

14. The method as recited in claim 13, wherein the training engine comprises a RankNet or a RankBoost training procedure.

15. The method as recited in claim 1, wherein reiteratively applying a set of candidate rankers to a training data set is performed using an FPGA-based accelerator.

16. A method for selecting the feature set for a ranking algorithm, the method comprising:
   constructing a set of ranking candidates using an initial set of features;
   applying each ranking candidate to a training data set comprising a plurality of ranking objects having a known pairwise ranking order and a weight distribution of ranking object pairs, each ranking candidate yielding a ranking result, wherein the ranking result is determined based in part on building a histogram and determining an integral histogram associated with the histogram;
   comparing the ranking results of the set of ranking candidates to identify a favored ranking candidate;
   analyzing the ranking result of the favored ranking candidate to identify ranking object pairs poorly ranked by the favored ranking candidate;
   adjusting the weight distribution by increasing the weights of the ranking object pairs poorly ranked by the favored ranking candidate;
   reiterating the above applying, comparing, analyzing, and adjusting, each iteration identifying a favored ranking candidate; and
   inferring a target feature set from the favored ranking candidates identified in previous iterations.

17. The method as recited in claim 16, wherein each ranking candidate is associated with one or more ranking features, and inferring a target feature set from the favored ranking candidates comprises:
   selecting at least some ranking features associated with the favored ranking candidates and including them in the target feature set.

18. One or more computer readable tangible physical memory devices having stored thereupon a plurality of instructions that, when executed by a processor, causes the processor to:
   reiteratively apply a set of ranking candidates to a training data set comprising a plurality of ranking objects having a known pairwise ranking order, wherein each iteration applies a weight distribution of ranking object pairs, yields a ranking result by each ranking candidate based in part on building a histogram and determining an integral histogram associated with the histogram, identifies a favored ranking candidate based on the ranking results, and updates the weight distribution to be used in next iteration by increasing weights of ranking object pairs that are poorly ranked by the favored ranking candidate; and
   prepare the favored ranking candidates identified in a plurality of iterations for inferring a target feature set therefrom.

* * * * *